(12) United States Patent
Mitsui et al.

(10) Patent No.: US 8,018,553 B2
(45) Date of Patent: Sep. 13, 2011

(54) LIQUID CRYSTAL DISPLAY DEVICE THAT INCLUDES BOTH A TRANSMISSIVE PORTION AND A REFLECTIVE PORTION

(75) Inventors: Masashi Mitsui, Anpachi-cho (JP); Norio Koma, Motosu-gun (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 11/902,036

(22) Filed: Sep. 18, 2007

(65) Prior Publication Data

US 2008/0068543 A1 Mar. 20, 2008

(30) Foreign Application Priority Data

Sep. 19, 2006 (JP) ................... 2006-252658

(51) Int. Cl.
*G02F 1/1335* (2006.01)
*G02F 1/1343* (2006.01)
(52) U.S. Cl. .................... 349/114; 349/139; 349/141
(58) Field of Classification Search .............. 349/114, 349/139, 141
See application file for complete search history.

(56) References Cited

U.S. PATENT DOCUMENTS

| 7,088,409 | B2 | 8/2006 | Itou et al. |
| 7,471,364 | B2 | 12/2008 | Park et al. |
| 2006/0087598 | A1* | 4/2006 | Lee et al. ................. 349/41 |
| 2006/0132684 | A1* | 6/2006 | Tanaka ................. 349/114 |
| 2006/0158586 | A1* | 7/2006 | Bruinink et al. ........ 349/114 |
| 2006/0192912 | A1* | 8/2006 | Itou et al. ............. 349/114 |

FOREIGN PATENT DOCUMENTS

| CN | 1811530 A | 8/2006 |
| JP | A-08-190104 | 7/1996 |
| JP | A-10-090704 | 4/1998 |
| JP | A-2001-318381 | 11/2001 |
| JP | A-2003-270627 | 9/2003 |
| JP | A-2004-198922 | 7/2004 |
| JP | A-2005-274904 | 9/2005 |
| JP | A-2005-338256 | 12/2005 |
| JP | A-2006-171376 | 6/2006 |

* cited by examiner

*Primary Examiner* — Nathaniel R Briggs
(74) *Attorney, Agent, or Firm* — K&L Gates LLP

(57) ABSTRACT

A liquid crystal display device includes, in sequence, a first substrate, a liquid crystal layer, and a second substrate. The first substrate, the liquid crystal layer, and the second substrate are disposed in a subpixel having a transmissive portion for performing transmissive display and a reflective portion for performing reflective display. The first substrate includes a first electrode and a second electrode. The second substrate includes a third electrode. The first electrode and the second electrode are disposed in the transmissive portion and at least the first electrode and the third electrode are disposed in the reflective portion. Alignment of the liquid crystal layer is controlled by an electric field occurring between the first electrode and the second electrode in the transmissive portion and by an electric field occurring between the first electrode and the third electrode in the reflective portion.

10 Claims, 3 Drawing Sheets

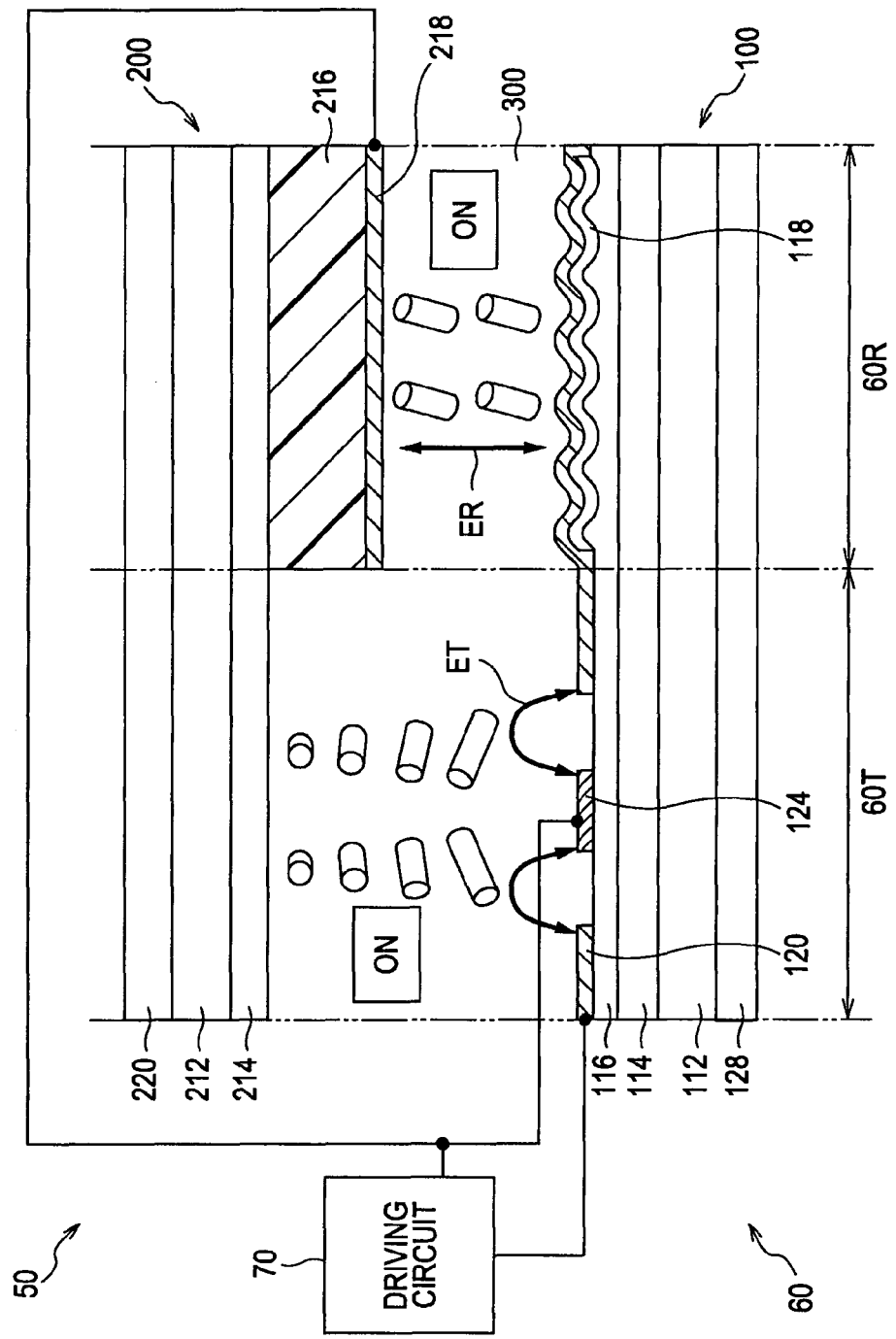

LIQUID CRYSTAL DISPLAY DEVICE THAT INCLUDES BOTH A TRANSMISSIVE PORTION AND A REFLECTIVE PORTION

BACKGROUND

1. Technical Field

The present invention relates to a liquid crystal display device and, more specifically, to a liquid crystal display device that includes both a transmissive portion for performing transmissive display and a reflective portion for performing reflective display in one subpixel and includes two electrodes for controlling alignment of liquid crystal molecules in one substrate.

2. Related Art

One example of a liquid crystal panel with a wide viewing angle is a liquid crystal panel of the fringe field switching (FFS) or in-plane switching (IPS) type. In these types, both a pixel electrode and a common electrode are provided in an element substrate, and liquid crystal molecules are rotated by control of an electric field occurring between both electrodes, thereby controlling alignment of the liquid crystal molecules.

Liquid crystal panels are broadly divided into the following types: a transmissive type which uses a backlight for displaying, a reflective type which uses reflection of outside light for displaying, and a transflective type which uses both transmissive and reflective structures built in one subpixel (see, for example, JP-A-2003-270627 and JP-A-2004-198922).

Existing transflective display devices of the twisted nematic (TN) type or electrically controlled birefringence (ECB) type suffer from an insufficient contrast and a narrow viewing angle. Transflective display devices of the vertical alignment (VA) type can have a high contrast and a wide viewing angle, but suffer from color changes in viewing from an angle.

In contrast to these TN or ECB display devices, transflective displays of the FFS or IPS type have excellent viewing-angle characteristics and have significantly small color changes in viewing from an angle, unlike VA transflective display devices. However, it is necessary to attach a retardation layer in order to perform both transmissive display and reflective display. This results in a problem of low contrast. In addition, the transflective FFS or IPS liquid crystal display device is thicker than transmissive FFS or IPS liquid crystal display devices.

SUMMARY

An advantage of some aspects of the invention is that it provides excellent display in a liquid crystal display device that includes both a transmissive portion for performing transmissive display and a reflective portion for performing reflective display in one subpixel and includes two electrodes for controlling alignment of liquid crystal molecules in one substrate.

According to an aspect of the invention, a liquid crystal display device includes, in sequence, a first substrate, a liquid crystal layer, and a second substrate. The first substrate, the liquid crystal layer, and the second substrate are disposed in a subpixel having a transmissive portion for performing transmissive display and a reflective portion for performing reflective display. The first substrate includes a first electrode and a second electrode. The second substrate includes a third electrode. The first electrode and the second electrode are disposed in the transmissive portion and at least the first electrode and the third electrode are disposed in the reflective portion. Alignment of the liquid crystal layer is controlled by an electric field occurring between the first electrode and the second electrode in the transmissive portion and by an electric field occurring between the first electrode and the third electrode in the reflective portion.

In accordance with the above structure, the reflective portion can be controlled by the first electrode in the first substrate and the third electrode in the second substrate. Therefore, a transflective liquid crystal display device that includes a transmissive portion of the FFS type with a wide viewing angle can be realized. Since a retardation layer is not arranged in the transmissive portion, a contrast decrease caused by a retardation layer in the transmissive portion can be reduced.

The liquid crystal display device may preferably include a retardation layer incorporated in the reflective portion.

The retardation layer may preferably be included in the second substrate.

The retardation layer may preferably be a half-wave plate.

The first electrode, an insulating layer, and the second electrode may preferably be stacked in the first substrate in this sequence. The second electrode may preferably have a slit in an area facing the first electrode.

A cell gap in the reflective portion may preferably be thinner than a cell gap in the transmissive portion.

The cell gap in the reflective portion may preferably be thinner than the cell gap in the transmissive portion due to the retardation layer.

The same electric potential may preferably be applied to the second electrode and the third electrode.

With the above described structure, excellent display can be obtained in a liquid crystal display device that includes both a transmissive portion and a reflective portion in one subpixel and includes two electrodes for controlling alignment of liquid crystal molecules in one substrate.

BRIEF DESCRIPTION OF THE DRAWINGS

The invention will be described with reference to the accompanying drawings, wherein like numbers reference like elements.

FIG. 3 is a schematic diagram for describing a liquid crystal display device according to another embodiment of the invention.

DESCRIPTION OF EXEMPLARY EMBODIMENTS

Embodiments of the invention will be described below with reference to the accompanying drawings.

Figure 1:
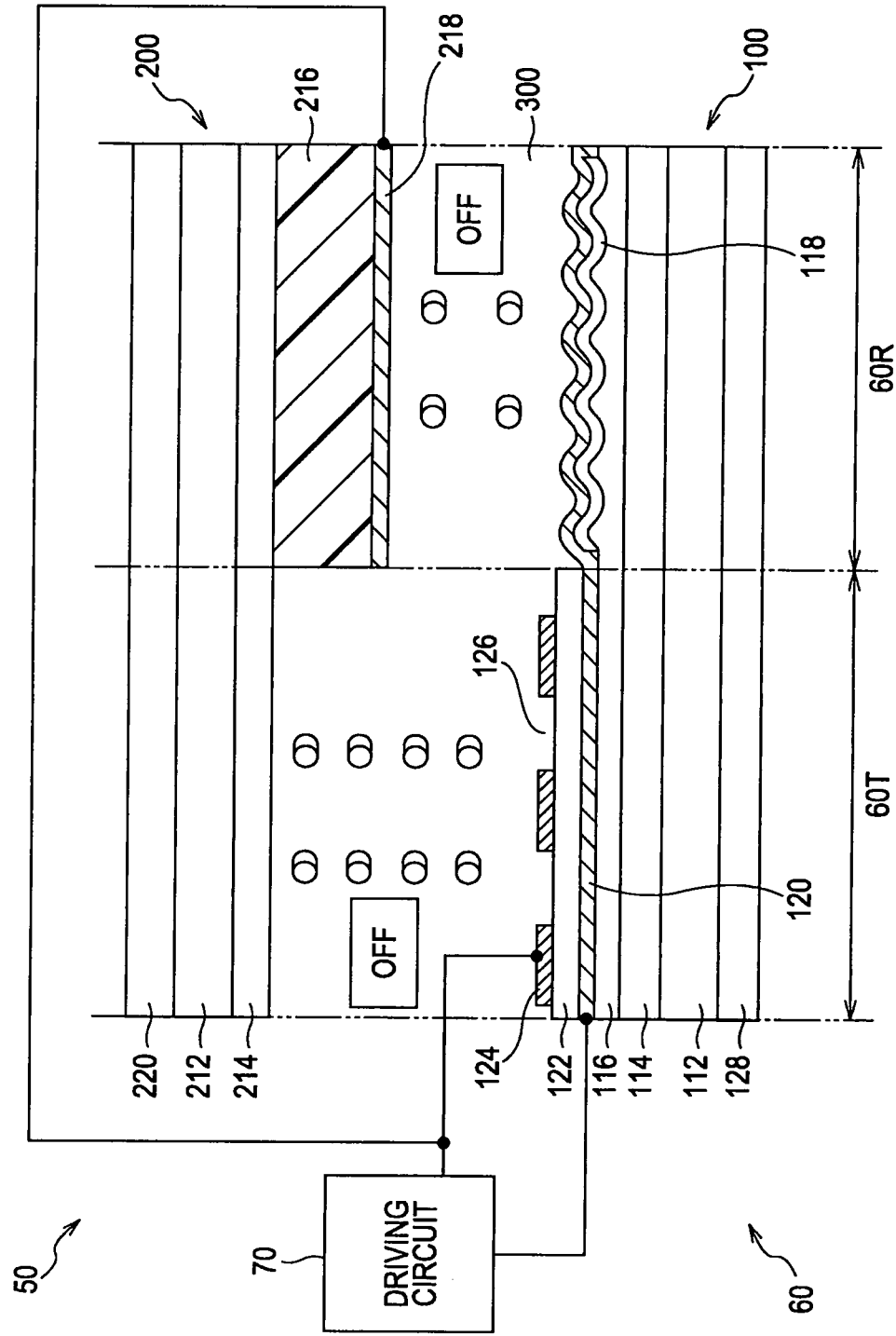
FIG. 1 is a schematic diagram for describing a liquid crystal display device according to an embodiment of the invention.
Figure 2:
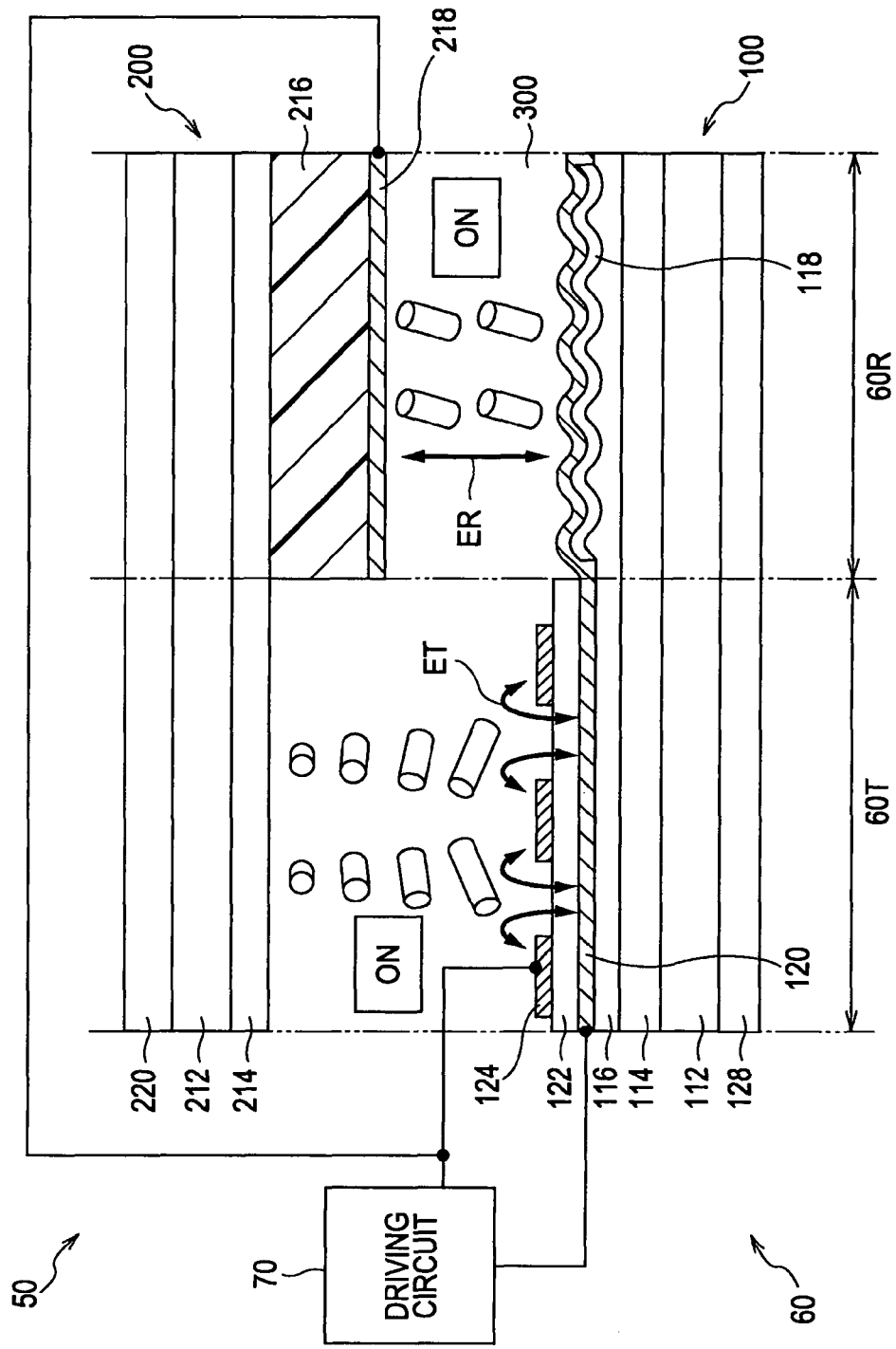
FIG. 2 is a schematic diagram for describing the liquid crystal display device according to the embodiment of the invention.

FIGS. 1 and 2 are schematic diagrams for describing a liquid crystal display device 50 according to an embodiment of the invention. The liquid crystal display device 50 includes a liquid crystal panel 60, a driving circuit 70 for driving the liquid crystal panel 60, and a backlight unit (not shown) arranged so as to face the liquid crystal panel 60. In FIGS. 1 to 3, one sub-pixel (also called a dot) in the liquid crystal panel 60 in cross section is illustrated. In these drawings, for the sake of brevity, hatching for some components is omitted.

The liquid crystal panel 60 includes a transmissive section 60T for performing transmissive display and a reflective section 60R for performing reflective display in one subpixel. Each of the transmissive section 60T and the reflective section 60R indicates not only a two-dimensional region in plan view of a subpixel but also a three-dimensional region in the liquid crystal panel 60 defined by projecting the two-dimensional region in the direction of thickness of the liquid crystal panel 60, i.e., in the direction of placement of substrates 100 and 200, which will be described below.

In the present embodiment, a case in which the liquid crystal panel 60 performs FFS transmissive display and performs ECB reflective display is illustrated.

The liquid crystal panel 60 includes the element substrate 100, the opposed substrate 200 opposed to the element substrate 100, and liquid crystal (a liquid crystal layer) 300 disposed between the substrates 100 and 200. Liquid crystal molecules in the liquid crystal 300 are schematically illustrated in the drawings.

The element substrate 100 includes a light-transmitting substrate 112. The element substrate 100 also includes, inside the light-transmitting substrate 112, i.e., adjacent to the liquid crystal 300 with respect to the light-transmitting substrate 112, a circuit layer 114, a planarization layer 116, a reflective film 118, a first electrode 120, an insulating film 122, a second electrode 124, and an alignment layer (not shown).

The light-transmitting substrate 112 can include, for example, a transparent glass plate.

The circuit layer 114 is a layer where various elements and a circuit for driving a subpixel are formed. The circuit layer 114 can have, for example, a pixel thin film transistor (TFT) and various leads. It is noted that, although the details of the circuit are not described here, various circuits are applicable. The circuit layer 114 is disposed on the light-transmitting substrate 112 across the transmissive section 60T and the reflective section 60R.

The planarization layer 116 can be made of, for example, insulating and light-transmitting resin and is disposed on the circuit layer 114 and is adjacent to the liquid crystal 300. The planarization layer 116 is disposed across the transmissive section 60T and the reflective section 60R. A surface of the planarization layer 116 adjacent to the opposed substrate 200 is flat in the transmissive section 60T and has asperities in the reflective section 60R. The asperities can be formed by any method, for example, by forming the planarization layer 116 from a photoresist material and pattern-exposing and developing the photoresist material.

The reflective film 118 can be made of a material that can reflect outside light (visible light) for reflective display, for example, aluminum. The reflective film 118 is disposed in the reflective section 60R and arranged on the asperities of the planarization layer 116. The shape of a surface of the reflective film 118 adjacent to the opposed substrate 200 is similar to the shape of the asperities of the planarization layer 116.

The first electrode 120 can be made of a light-transmitting conductive material, for example, indium tin oxide (ITO). The first electrode 120 is disposed on the planarization layer 116 so as to cover the reflective film 118. The first electrode 120 is disposed across the transmissive section 60T and the reflective section 60R. That is, the first electrode 120 is a common electrode for both the transmissive section 60T and the reflective section 60R. A surface of the first electrode 120 adjacent to the opposed substrate 200 is flat in the transmissive section 60T and has a shape similar to that of the asperities of the reflective film 118 and the planarization layer 116 in the reflective section 60R.

When the reflective film 118 is conductive, the first electrode 120 may cover only a part of the entire surface of the reflective film 118 as long as the first electrode 120 is connected to the reflective film 118. In other words, the reflective film 118 can function as a portion of the first electrode 120 in the reflective section 60R.

In FIGS. 1 to 3, for the sake of clarity, a connection between the first electrode 120 and the driving circuit 70 is schematically illustrated. An electric potential can be applied to the first electrode 120 via, for example, the pixel TFT in the circuit layer 114.

The insulating film 122 can be made of, for example, silicon oxide or silicon nitride. The insulating film 122 is disposed on the flat surface of the first electrode 120 in the transmissive section 60T. A surface of the insulating film 122 adjacent to the opposed substrate 200 is flat.

The second electrode 124 can be made of a light-transmitting conductive material, for example, ITO. The second electrode 124 is disposed on the insulating film 122 in the transmissive section 60T. The second electrode 124 faces the first electrode 120 with the insulating film 122 disposed therebetween. That is, the first electrode 120, the insulating film 122, and the second electrode 124 are stacked in this sequence. Both the second electrodes 124 and the first electrode 120 are provided in the element substrate 100, which means that both electrodes are situated at the same side with respect to the liquid crystal 300. The second electrode 124 has a slit 126 at a portion that faces the first electrode 120. In the present embodiment, a case in which the slit 126 extends in a substantially vertical direction in the drawings is illustrated. An electric field ET resulting from a potential difference between the first electrode 120 and the second electrode 124 occurs through the slit 126 and the insulating film 122 (see FIG. 2). The electric field ET controls the alignment state of the liquid crystal molecules in the liquid crystal 300 in the transmissive section 60T.

In FIGS. 1 to 3, for the sake of clarity, a connection between the second electrode 124 and the driving circuit 70 is schematically illustrated. An electric potential can be applied to the second electrode 124 via, for example, the leads in the circuit layer 114.

The alignment layer (not shown) is arranged so as to cover the second electrode 124, the insulating film 122, and the first electrode 120 and be in contact with the liquid crystal 300.

The opposed substrate 200 includes a light-transmitting substrate 212. The opposed substrate 200 also includes, inside the light-transmitting substrate 212, i.e., adjacent to the liquid crystal 300 with respect to the light-transmitting substrate 212, a color filter 214, a retardation film 216, a third electrode 218, and an alignment layer (not shown).

The light-transmitting substrate 212 can include, for example, a transparent glass plate.

The color filter 214 can be made of, for example, colored resin and is disposed across the transmissive section 60T and the reflective section 60R on the light-transmitting substrate 212. The color filter 214 colors light incident from the backlight adjacent to the element substrate 100 and light incident from the outside adjacent to the opposed substrate 200, thus causing a subpixel to light with a predetermined color. The color of the color filter 214 is set in accordance with a display color (a single color) of each subpixel. One unit constituted of adjacent subpixels of a plurality of colors is called a pixel.

In the present embodiment, a case in which the retardation film 216 corresponds to a half-wave plate is described. In this case, the direction of polarization of linearly polarized light can be rotated approximately 45° clockwise (or counterclockwise) by the retardation film 216. The retardation film 216 is more adjacent to the liquid crystal 300 than the color filter 214 and is disposed on the color filter 214 in the reflective section 60R. In this case, the retardation film 216 is incorporated in the liquid crystal panel 60. The term "incorporated" used herein indicates a state of being arranged between the light-transmitting substrates 112 and 212. For example, the pixel TFT is regarded as being incorporated in the liquid crystal panel 60.

The retardation film 216 can be formed by use of ultraviolet curable liquid crystal, which is liquid crystal curable by ultraviolet rays. More specifically, the retardation film 216 can be formed by forming an alignment layer (not shown) on the color filter 214, applying UV-curable liquid crystal in a liquid state to the alignment layer, and curing the UV-curable liquid crystal with ultraviolet radiation. In this case, the retardation film 216 includes the UV-curable liquid crystal, or, in addition thereto, the alignment layer. This alignment layer controls alignment of the UV-curable liquid crystal molecules, not alignment of the liquid crystal molecules in the liquid crystal 300. Various alignment layers can be used as the alignment layer for the UV-curable liquid crystal. For example, an optical alignment layer that carries out a function of aligning liquid crystal molecules in response to light irradiation is applicable. The use of such an optical alignment layer obviates the necessity of rubbing. The UV-curable liquid crystal functions as a retardation film by being UV-cured (cured by UV radiation). The phase difference is adjustable by changing the thickness of the UV-curable liquid crystal.

The third electrode 218 can be made of a light-transmitting conductive material, for example, ITO. The third electrode 218 is more adjacent to the liquid crystal 300 than the retardation film 216 and is disposed on the retardation film 216 in the reflective section 60R. The third electrode 218 faces the first electrode 120 with the liquid crystal 300 disposed therebetween. That is, the third electrode 218 and the first electrode 120 are disposed on opposite sides of the liquid crystal 300. An occurring electric field ER resulting from a potential difference between the third electrode 218 and the first electrode 120 controls the alignment state of the liquid crystal molecules in the liquid crystal 300 in the reflective section 60R (see FIG. 2).

The same potential as that applied to the second electrode 124 can be applied to the third electrode 218. In FIGS. 1 to 3, a case in which the leads branch off from the driving circuit 70 in directions that reach the third electrode 218 and second electrode 124 is schematically illustrated. As an alternative to this case, a structure may be used in which a branch point is present in the liquid crystal panel 60 and the same potential can be applied to both the second electrode 124 and the third electrode 218. Alternatively, the third electrode 218 and the second electrode 124 may be provided with respective leads from the driving circuit 70, and the same potential may be output thereto from the driving circuit 70.

The alignment layer (not shown) is arranged so as to cover the third electrode 218, the retardation film 216, and the color filter 214 and be in contact with the liquid crystal 300.

The liquid crystal panel 60 further includes polarizers 128 and 220. The polarizer 128 is disposed outside the element substrate 100, that is, on a side opposite to the liquid crystal 300 with respect to the light-transmitting substrate 112. The polarizer 220 is disposed outside the opposed substrate 200, that is, on a side opposite to the liquid crystal 300 with respect to the light-transmitting substrate 212.

The driving circuit 70 is connected to the first electrode 120, the second electrode 124, and the third electrode 218 and includes various elements for generating a potential to be applied thereto and transmitting the potential. These various elements can be attached externally, incorporated, or implemented and can include a pixel TFT in the circuit layer 114. The driving circuit 70 generates the potential to be applied and applies the generated potential to each of the first electrode 120, the second electrode 124, and the third electrode 218 with a predetermined timing.

An example operation of the liquid crystal display device 50 will now be described with reference to FIGS. 1 and 2. Here, as previously above, a case in which FFS transmissive display and ECB reflective display are performed is illustrated. For the liquid crystal 300, dielectric anisotropy is, for example, positive, and anisotropy of refractive index (also called birefringence) Δn is, for example, 0.1.

The liquid crystal panel 60 is structured such that, when the potential difference between the first electrode 120 and the second electrode 124 is an OFF voltage, the transmissive display is in dark display, at which luminance is lowest, and, when the potential difference between the first electrode 120 and the third electrode 218 is an OFF voltage, the reflective display is in dark display (see FIG. 1). The luminance in the transmissive display corresponds to transmittance, and the luminance in the reflective display corresponds to reflectance. The dark display is also called a dark state and black display. A state in which the luminance is highest is referred to as bright display. The bright display is also called a bright state and white display. The OFF voltage is a voltage that realizes the dark display or bright display and produces almost none of the electric fields ET and ER. In contrast to this, a voltage that realizes the dark display or bright display and produces the electric fields ET and ER larger than when the OFF voltage is applied is referred to as an ON voltage.

Therefore, in the present embodiment, both the transmissive section 60T and the reflective section 60R operate in the normally black mode, and the pixels as a whole also operates in the normally black mode. This structure is practicable by adjustment of a material of the liquid crystal 300, an alignment state of the liquid crystal molecules in the liquid crystal 300 during application of the OFF voltage (a so-called initial alignment state), the direction of rubbing of the alignment layer, and characteristics and arrangement of the polarizers 128 and 220 and the retardation film 216.

Since the same potential is applied to the second electrode 124 and the third electrode 218 in the liquid crystal display device 50, the transmissive section 60T and the reflective section 60R become the dark display at the same time in response to application of the OFF voltage. That is, the entire pixels become the dark display. The transmissive section 60T and the reflective section 60R can become the bright display at the same time in response to application of the ON voltage, and, at this time, the entire pixels become the bright display (see FIG. 2).

A more specific example operation will be described below.

For example, the liquid crystal molecules in the liquid crystal 300 are initially aligned (that is, are aligned in a substantially vertical direction in the drawings) such that the major axis of the liquid crystal molecules is substantially parallel to the surface of each of the first electrode 120, the second electrode 124, and the third electrode 218 and is substantially parallel to a direction in which the slit 126 extends during application of the OFF voltage in the transmissive section 60T and the reflective section 60R. The rubbing direction in the transmissive section 60T and that in the reflective section 60R are set at the same direction. The polarizer 128 is arranged such that its polarization axis is substantially perpendicular to the major axis of the liquid crystal molecules in the initial alignment state. The polarizer 220 is arranged such that its polarization axis is substantially perpendicular to the polarization axis of the polarizer 128 (so-called perpendicular arrangement).

In this case, for the transmissive display, light from the backlight adjacent to the element substrate 100 enters the polarizer 128 and then linearly polarized light that is substantially perpendicular to the major axis of the liquid crystal molecules exits from the polarizer 128. From the relationship between the polarization direction of the linearly polarized light and the alignment direction of the liquid crystal molecules, birefringence of the liquid crystal 300 have little effect on the linearly polarized light, the linearly polarized light reaches the polarizer 220 while maintaining its polarized state. Because the polarization direction of the linearly polarized light is substantially perpendicular to the polarization axis of the polarizer 220, the linearly polarized light cannot pass through the polarizer 220. As a result, the transmissive display is in dark display.

For the reflective display, light from the outside adjacent to the opposed substrate 200 enters the polarizer 220 and then linearly polarized light that is substantially parallel to the major axis of the liquid crystal molecules exits from the polarizer 220. The polarization direction is rotated approximately 45° by the previously described operation of the retardation film 216, and the linearly polarized light enters the liquid crystal 300 in this polarized state. The liquid crystal 300 in the reflective section 60R has been adjusted so as to function similarly to a quarter-wave plate using their birefringence. In this case, the linearly polarized light is transformed to clockwise (or counterclockwise) substantially circularly polarized light. The substantially circularly polarized light transformed by the liquid crystal 300 after having been externally input is reflected by the reflective film 118, passes through the liquid crystal 300, and is transformed to linearly polarized light whose polarization is rotated approximately 90° with respect to linearly polarized light entering the liquid crystal 300 from the retardation film 216. Then, the light is transformed by the retardation film 216 to light whose polarization direction is rotated approximately −45° and reaches the polarizer 220. Because the polarization direction of the linearly polarized light that has returned the polarizer 220 is substantially perpendicular to the polarization axis of the polarizer 220, the linearly polarized light cannot pass through the polarizer 220. As a result, the reflective display is in dark display.

When the voltage is changed from the OFF to ON voltage, both the transmissive display and the reflective display leave the dark display (see FIG. 2). The luminance in each of the transmissive display and the reflective display increases with an increase in the magnitude of an applied voltage.

In the transmissive section 60T, in response to application of the ON voltage, liquid crystal molecules near the element substrate 100 are aligned in a direction that is substantially parallel to the surface of each of the first electrode 120 and the second electrode 124 and substantially perpendicular to a direction in which the slit 126 extends. In contrast, liquid crystal molecules near the opposed substrate 200 remain in the initial alignment state.

Therefore, the liquid crystal molecules in the transmissive section 60T are aligned as a whole so as to be twisted approximately 90° around the normal of each of the second electrode 124 and the first electrode 120. In this case, the polarization direction of light linearly polarized by the polarizer 128 after having been input from the backlight is substantially parallel to the major axis of the liquid crystal molecules near the element substrate 100, and the linearly polarized light is optically rotated in accordance with the twisted alignment direction of the liquid crystal molecules. Therefore, the linearly polarized light is substantially parallel to the major axis of the liquid crystal molecules near the opposed substrate 200 when reaching the polarizer 220. Because the polarization direction of this linearly polarized light is substantially parallel to the polarization axis of the polarizer 220, the transmissive display is in bright display.

In the reflective section 60R, in response to application of the ON voltage, the liquid crystal molecules are aligned in a direction that is substantially perpendicular to the surface of each of the first electrode 120 and the third electrode 218. Light incident from the outside adjacent to the opposed substrate 200 follows the same similar path (optical path) as in the dark display and then returns to the polarizer 220, and, because of the alignment state described above, birefringence of the liquid crystal 300 have little effect thereon. Therefore, the externally input light that has returned to the polarizer 220 is linearly polarized light that is substantially parallel to the polarization axis of the polarizer 220 as a result of being subjected to the rotation operation of the retardation film 216 twice, i.e., going and returning, in total. Therefore, the linearly polarized light passes through the polarizer 220. As a result, the reflective display is in bright display.

In the foregoing, how the dark display and the bright display are performed is described. The luminance level between the dark display and the bright display, so-called halftones, can be controlled by control of the magnitude of the applied voltage.

According to the above described structure, since the transmissive section 60T is of the FFS type and the reflective section 60R is of the ECB type, excellent display can be obtained in both the reflective display and the transmissive display. With a structure in which a retardation layer is disposed within a reflective portion, it is not necessary to attach another retardation film to the outer surface. Therefore, a liquid crystal panel of this type can be thinner than a transflective liquid crystal panel of other types. The retardation film 216 also serves as a layer for reducing the cell gap in the reflective section 60R smaller than that in the transmissive section 60T. This can reduce manufacturing steps.

Since the reflective section 60R of the ECB type, which has higher reflectance than that in the FFS type, the reflective display can exhibit higher luminance, compared with when both the transmissive section 60T and the reflective section 60R are of the FFS type.

Since the reflective section 60R is not of the FFS type, even when the planarization layer 116 has asperities, it is not necessary to form the second electrode 124 having the slit 126 on these asperities. Therefore, there are no patterning defects caused by a slit on the asperities. Therefore, excellent reflective display can be obtained. In the transmissive display, the FFS type offers a wide viewing angle and a high contrast.

In typical FFS display devices, an ITO film is often provided to the outer surface of an opposed substrate in order to shield an external electric field. However, according to the above described structure, it is not necessary to have an external shielding structure. This is because the third electrode 218 of the opposed substrate 200 carries out the shielding function. Even when not all areas of the opposed substrate 200 are covered by the third electrode 218, the third electrode 218 can perform the shielding function.

Since the retardation film 216 is not provided to the transmissive section 60T, unlike when the retardation film 216 is externally attached without making a distinction between the transmissive section 60T and the reflective section 60R, the FFS transmissive display ensures a wide viewing angle and high contrast.

The presence of the retardation film 216 reduces the cell gap in the reflective section 60R smaller than that in the transmissive section 60T (so-called multi-gap construction).

For example, the cell gap in the transmissive section 60T is approximately 3.0 µm, and that in the reflective section 60R is approximately 1.4 µm. As a result, the cell gap in each of the transmissive section 60T and the reflective section 60R can be adjusted without additional top coating layer. For example, the cell gap in the reflective section 60R can be adjusted to a value suitable for the ECB type.

In the foregoing, the transmissive display is of the FFS type. However, the transmissive display may be of the IPS type. In the case of the IPS type, as illustrated in FIG. 3, the first electrode 120 and the second electrode 124 are disposed on the planarization layer 116, i.e., on the same layer. FIG. 3 illustrates a state in which the entire pixels are in bright display.

The normally white mode can also be realized by arranging the polarizers 128 and 220 such that their respective polarization axes are substantially parallel to each other.

What is claimed is:

1. A liquid crystal display device comprising, in sequence:
   a first substrate;
   a liquid crystal layer; and
   a second substrate,
   wherein the first substrate, the liquid crystal layer, and the second substrate are disposed in a subpixel having a transmissive portion for performing transmissive display and a reflective portion for performing reflective display,
   the first substrate includes a first electrode and a second electrode formed above the first electrode, the second substrate includes a third electrode,
   the first electrode is disposed in the transmissive portion and the reflective portion, the second electrode is disposed in the transmissive portion but not in the reflective portion, and the third electrode is disposed in the reflective portion, and
   alignment of the liquid crystal layer is controlled by an electric field occurring between the first electrode and the second electrode in the transmissive portion and by an electric field occurring between the first electrode and the third electrode in the reflective portion.

2. The liquid crystal display device according to claim 1, further comprising:
   a retardation layer incorporated in the reflective portion.

3. The liquid crystal display device according to claim 2, wherein the retardation layer is included in the second substrate.

4. The liquid crystal display device according to claim 3, wherein the retardation layer is a half-wave plate.

5. The liquid crystal display device according to claim 2, wherein, due to the retardation layer, a cell gap in the reflective portion is thinner than a cell gap in the transmissive portion.

6. The liquid crystal display device according to claim 1, wherein a cell gap in the reflective portion is thinner than a cell gap in the transmissive portion.

7. The liquid crystal display device according to claim 1, wherein the first electrode, an insulating layer, and the second electrode are stacked in the first substrate in this sequence, and the second electrode has a slit in an area facing the first electrode.

8. The liquid crystal display device according to claim 1, wherein the same electric potential is applied to the second electrode and the third electrode.

9. The liquid crystal device as set forth in claim 1, further comprising: a first polarizer disposed at a side of the first substrate opposite the liquid crystal;
   a second polarizer disposed at a side of the second substrate opposite the liquid crystal; and
   a retardation layer disposed in a reflecting portion of the second substrate, the retardation layer being a 1/2 wavelength plate,
   a transmissive axis of the first polarizer being arranged so that the light which has entered the first polarizer enters the liquid crystal as polarized light substantially parallel to a long axis of a liquid crystal molecule of the liquid crystal layer in a bright display of the transmissive portion and substantially perpendicular to the long axis of the liquid crystal
   molecule in a dark display of the transmissive portion,
   the bright display being defined by an electric field occurring between the first and second electrodes and the dark display being defined by an electric field not occurring between the first and second electrodes.

10. The liquid crystal device as set forth in claim 1, further comprising: a first polarizer disposed at a side of the first substrate opposite the liquid crystal;
    a second polarizer disposed at a side of the second substrate opposite the liquid crystal, a transmissive axis of the first polarizer and a transmissive axis of the second polarizer being arranged substantially perpendicular to each other; and
    a retardation layer arranged at a reflecting portion of the second substrate, the retardation layer being a 1/2 wavelength plate, which rotates a polarization direction of linearly polarized light entered from the second polarizer by 45°,
    wherein in the transmissive portion, during a bright display, light from the first polarizer enters the liquid crystal as linearly polarized light that is substantially parallel to a long axis of a liquid crystal molecule of the liquid crystal, and the linearly polarized light is optically rotated in the liquid crystal according to a state in which the liquid crystal is twisted and aligned such that the light enters the second polarizer substantially parallel to the transmissive axis of the second polarizer,
    in the transmissive portion, in a dark display, light from the first polarizer enters the liquid crystal as linearly perpendicular light that is substantially parallel to the long axis of the liquid crystal molecule of the liquid crystal such that the linearly polarized light enters the second polarizer in the same polarization state, and
    the bright display is defined by an electric field occurring between the first and second electrodes and the dark display is defined by an electric field not occurring between the first and second electrodes.

* * * * *